US012430583B2

(12) United States Patent
Gilad et al.

(10) Patent No.: US 12,430,583 B2
(45) Date of Patent: Sep. 30, 2025

(54) METHOD AND SYSTEM FOR MANAGING EMBEDDINGS AND SERVING RECOMMENDATIONS IN REAL-TIME

(71) Applicant: YAHOO AD TECH LLC, Dulles, VA (US)

(72) Inventors: Eran Gilad, Mishmar HaEmek (IL); Idit Keidar, Haifa (IL); Eshcar Hillel, Binyamina (IL); Dmitry Basin, Haifa (IL)

(73) Assignee: YAHOO AD TECH LLC, New York, NY (US)

( * ) Notice: Subject to any disclaimer, the term of this patent is extended or adjusted under 35 U.S.C. 154(b) by 1008 days.

(21) Appl. No.: 17/513,099

(22) Filed: Oct. 28, 2021

(65) Prior Publication Data

US 2022/0366302 A1 Nov. 17, 2022

Related U.S. Application Data

(60) Provisional application No. 63/188,715, filed on May 14, 2021.

(51) Int. Cl.
*G06N 20/00* (2019.01)
*G06F 40/00* (2020.01)
*G06F 40/197* (2020.01)

(52) U.S. Cl.
CPC .............. *G06N 20/00* (2019.01); *G06F 40/00* (2020.01); *G06F 40/197* (2020.01)

(58) Field of Classification Search
CPC ........ G06N 20/00; G06F 40/00; G06F 40/197
USPC ......................................................... 715/229
See application file for complete search history.

(56) References Cited

U.S. PATENT DOCUMENTS

| | | | |
|---|---|---|---|
| 2003/0115547 A1* | 6/2003 | Ohwada | G06F 40/197 715/229 |
| 2012/0226658 A1* | 9/2012 | Connor | G06F 16/93 707/E17.005 |
| 2017/0220617 A1* | 8/2017 | Bortnikov | G06F 16/2329 |
| 2020/0372405 A1* | 11/2020 | Garcia | G16H 10/20 |
| 2021/0209357 A1* | 7/2021 | Alikhani | G06F 16/353 |
| 2022/0269884 A1* | 8/2022 | Walters | G06V 30/418 |

\* cited by examiner

*Primary Examiner* — William D Titcomb
(74) *Attorney, Agent, or Firm* — James J. DeCarlo; Greenberg Traurig, LLP

(57) ABSTRACT

The disclosed embodiments describe techniques for isolating and managing models via versioning. In one embodiment, a method is disclosed comprising reading a configuration document associated with a first model; incrementing an internal write version of the configuration document; storing the internal write version in the configuration document; generating documents belonging to a second model such that respective document identifiers of the documents include a next external version a first field and the incremented internal write version in a second field; and uploading the documents to a serving system, causing the serving system to replace the first model with the second model.

20 Claims, 8 Drawing Sheets

METHOD AND SYSTEM FOR MANAGING EMBEDDINGS AND SERVING RECOMMENDATIONS IN REAL-TIME

CROSS-REFERENCE TO RELATED APPLICATIONS

The application claims priority to provisional application Ser. No. 63/188,715, filed May 14, 2021, incorporated by reference in its entirety.

BACKGROUND

In the era of big data, search engines and recommendation systems have adopted machine learning (ML) models with ever-increasing popularity. Certain types of ML models can consist of many vector embeddings that describe the semantic similarity of entities modeled by their proximity in vector spaces. However, embeddings of the same model are dependent. That is, for an inference to be correct, it must use embeddings belonging to a single model. Thus, the similarity of entities is only meaningful in the context of a single model.

Many contemporary search systems (e.g., Vespa™ by Yahoo!, Elasticsearch® by Elasticsearch B.V., and Pinecone® by Pinecone Systems, Inc.) support storage and retrieval of model embeddings. Retrieval can include returning the embedding representation of a specific entity or the result of more complex queries like nearest neighbor (NN) and top-N dot-product search. Such systems often store each embedding in a separate document. Consequently, updating a model involves updating multiple documents, which can be a lengthy operation.

BRIEF SUMMARY

The disclosed embodiments describe techniques for isolating and managing ML models via versioning. In one embodiment, a method includes reading a configuration document and incrementing an internal write version of the configuration document. In some embodiments, the configuration document is associated with an ML model. After incrementing the internal write version, the method includes storing updated configuration (e.g., the updated write version) in the configuration document and generating documents belonging to a new model such that respective document IDs of the documents include a next external version and the documents internally store the incremented internal write version in a dedicated field. Then, the method includes uploading the new model's documents to a serving system, the new model replacing the existing model in the serving system.

In one embodiment, upon successful upload, the method further comprises updating the configuration document such that an internal read version of the configuration document stores the incremented internal write version, and the external version stores a next value. In a further embodiment, documents of the new model comprise model-related documents and shared documents, the generated new model's documents storing only model-related documents, and the shared documents storing only model-agnostic data describing one or more aspects of a modeled entity that are occasionally updated, non-atomically. In a further embodiment, the external version of the document IDs cycles through a limited range of numbers.

In one embodiment, the method further comprises reading the configuration document to obtain an internal read version and filtering accesses to the new model's documents during an inference by the serving system such that only documents storing the read version are utilized.

In one embodiment, the method further comprises detecting and discarding obsolete documents by separating the documents into discrete sets so that a majority of old documents are automatically overwritten in each model update and need not be explicitly discarded; detecting documents that have not been overwritten by comparing their internal read version to the current internal read version in the configuration; when the serving system supports parent-child relations, each document references its configuration document and imports its read_version field as latest_version; and when the serving system provides automatic garbage collection based on a predefined filter, using the filter to compare each document's read_version and latest_version fields and discard the document if the difference is larger than one.

The disclosed embodiments further provide non-transitory computer-readable storage media and devices for performing the above methods. In one embodiment, the non-transitory computer-readable storage media tangibly stores computer program instructions capable of being executed by a computer processor, the computer program instructions defining steps of the methods.

DETAILED DESCRIPTION

Figure 1:
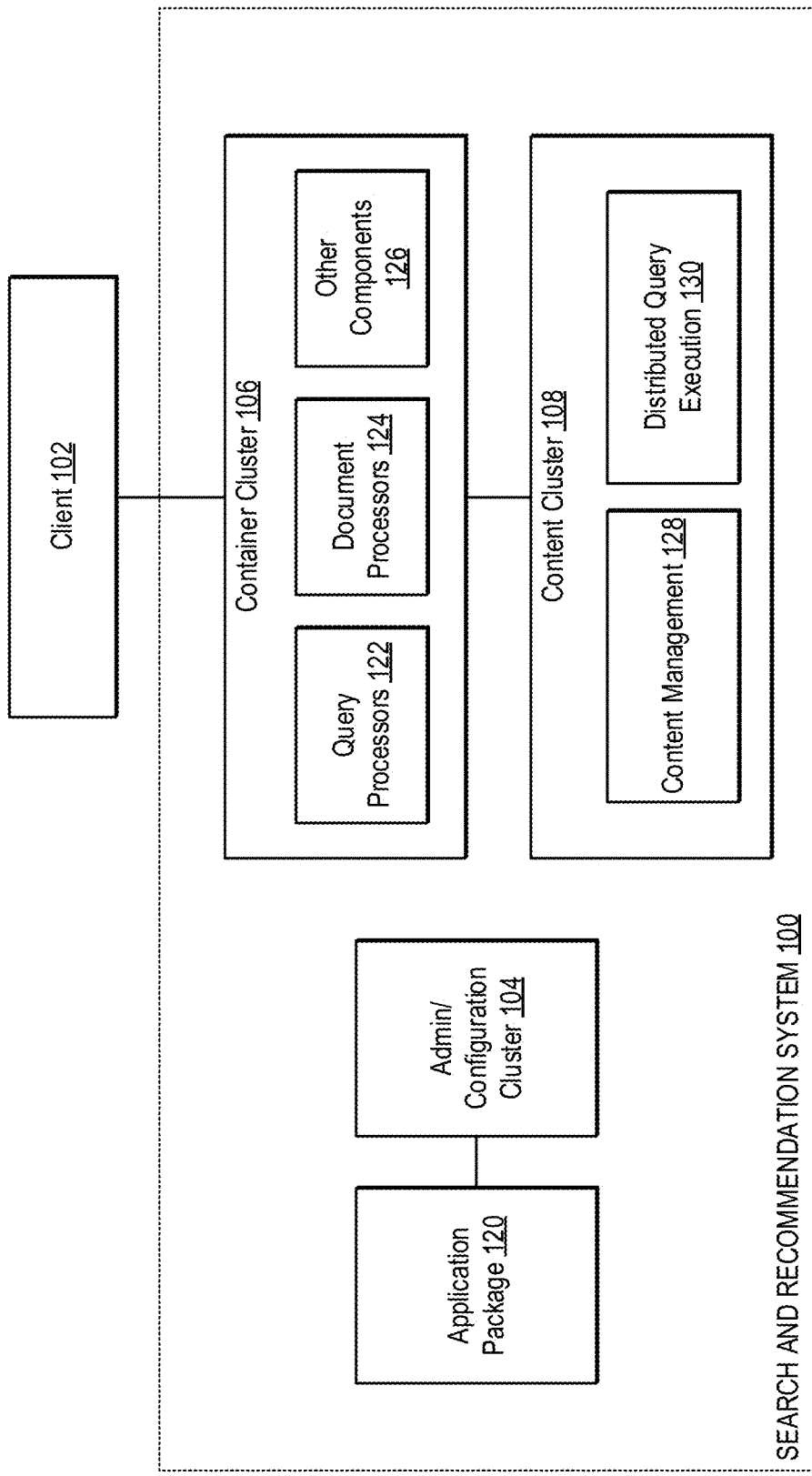
FIG. 1 is a block diagram illustrating a search and recommendation system according to some embodiments.

As disclosed herein, an application using embeddings is provided with a consistent view of the complete model regardless of ongoing updates associated with, for example, a model being updated by a single feed at a time, or different models being updated by multiple respective feeds. In some embodiments, the application always sees embeddings belonging to a single model, even when a new model (or related model data) is being uploaded or has already become the effective model. This consistency guarantee remains true despite the application performing a series of model accesses during operation or experiencing updates from multiple independent feeds. Further, in serving systems that support parent-child relations among documents, some embodiments herein allow de-coupling of model-specific (e.g., per-model) data from model-agnostic data (e.g., data shared among models). In some embodiments, the disclosed methods can be provided in a generic manner or partially implemented in various model serving systems that do not support parent-child relations as well.

In general, recommender systems that run on top of such search engines have the following characteristics: A) an entity can be included in multiple models, each capturing different one or more aspects of a dataset. For example, entities such as users and advertisements can be included in both a model that predicts clicks and another model that predicts conversion (e.g., post-click engagement); B) in addition to the embeddings representation, entities can also have metadata of interest (e.g., user location and ad type). Such metadata is model-agnostic, often obtained from a separate source than the model; C) since different models and the entity metadata can be based on data from different sources and generated independently, it is beneficial to de-couple their updates from each other. As such, each model and the respective metadata is allowed to be updated without interfering with each other; D) metadata fields can be used to refine model-based operations. For instance, a recommendation can consider only ads of a certain type such that all other ads are filtered out before being used in the embeddings-based ranking; E) embedding-based queries may require multiple accesses to the serving system. For instance, finding ads that are similar to a given set of ads requires multiple accesses to the serving system. In this example, the embeddings of the input ads are obtained first and then combined into a single vector. Afterward, the serving system is queried again for the ads whose embeddings are closest to the combined vector. For this procedure to be correct, the same model should be used on all stages of access to the serving system, despite whether a new model has been uploaded in parallel (in the meantime) to the serving system.

As will be further described in connection with illustrative embodiments below, various technical challenges have been recognized and addressed herein. For example, during a model update, ongoing inferences of a single user-query session must not consider the embeddings belonging to the new model. Further, once the new model has been fully uploaded, it must become the current model at once. That is, a query aiming to find a match for a set of users in the example described above must not mix old and new embeddings, and at all times, only be based on the most recent model available in the system.

For another example, there needs to be a way to detect embeddings belonging to old models and safely discard them (e.g., garbage collection). Such metadata updates should not be blocked by a model update and vice versa. Once an update is done for a model or metadata, new inferences must be based on the freshest data available. Further, metadata should not be duplicated if the same entities are contained or modeled in multiple models.

In some embodiments, in serving systems that support parent-child relations (e.g., Vespa, Elasticsearch), model data (e.g., model-specific data) such as embeddings can be stored separately from model-agnostic data (e.g., date, author, title). In one non-limiting example, the parent-child relations can be used to associate documents storing model data to documents storing model-agnostic data. Various other techniques and data structures that enable association among documents may be applicable herein without limitation.

Thus, while existing search engines can handle efficient real-time retrieval of a single embedding or complex queries via nearest neighbor (NN) search and top-N search, they do not support atomicity of multiple inferences based on a single model and are filtered by model-agnostic features. As will be further described in connection with illustrative embodiments below, the technologies presented herein solve the problems in an efficient way, provides real-time performance, incurs no downtime during model updates, and have minimal data duplication, among other improvements.

As used herein, a model or an ML model receives input and generates an output based on the received input and on values of the parameters of the model. An ML model may be composed of, e.g., a single level of linear or non-linear operations or may be a deep network, i.e., an ML model that is composed of multiple levels, one or more of which may be layers of non-linear operations. An example of a deep network is a neural network with one or more hidden layers.

As used herein, the term embedding refers to a set of feature representations that are mapped to vectors. Various methods and techniques can be used to generate this mapping, including, for example, neural networks. For example, an embedding function of a deep network can receive a respective feature of a respective type and, in accordance with a set of parameters, apply a transformation to the feature that maps the feature into a numeric representation. Embeddings can also be generated and used in conjunction with ranking and other post-search processing functions.

FIG. 1 is a block diagram illustrating a search and recommendation system according to some embodiments.

In some embodiments, the search and recommendation system 100 can be implemented in a big data serving system such as Vespa™ by Yahoo. While the following embodiments utilize Vespa-formatted file formats and other conventions, the disclosure is not limited as such. In some embodiments, the search and recommendation system 100 can be configured as a search engine for providing search functionality and/or recommendation functionality. In this embodiment of FIG. 1, the system 100 is shown to illustrate the interactions of various exemplary components related to the management of embeddings and serving recommendations according to some embodiments of the disclosure. In some embodiments, the illustrated management of embeddings and/or serving of recommendations may be performed in real-time, near real-time, or in any suitable temporal manner.

A client 102 can query the container cluster 106 (via query processor 122) to retrieve news articles both in a search mode and a recommendation mode. In an embodiment, an application package 120 can comprise a set of files in a specific structure that defines a deployable application, and such files can include a set of configuration files, components (e.g., plugins), and ML models. In some embodiments, the application package 120 can comprise a directory of files and configuration data (e.g., a "services.xml" file). In an embodiment, the application package 120 can be used to deploy a system to a cloud-based infrastructure.

The system 100 can also include an administration and config cluster 104, which can, for example, manage other clusters (e.g., container cluster 106 and content clusters 108) and handle requests to change the configuration of the search and recommendation system 100. In an embodiment, the administration and config cluster 104 can receive the application package 120 and launch the system defined by the application package 120 (e.g., in the services.xml file) into a cloud infrastructure. For example, container cluster 106 and content clusters 108 can be deployed in response to the application package 120.

During run time, the search and recommendation system 100 includes a container cluster 106 and content clusters 108 for storing data. Together, those clusters implement various features of the application package 120, such as search functionality, document types, ranking criteria, query processing, and document processing (e.g., via document processor 124) during ingestion and indexing. As illustrated, container cluster 106 can include various other components 126 configured to perform some or all of the operations. The application package 120 can be deployed for different types of search and recommendation services. The following description uses a personalized news recommendation service enabled by the application package 120 as an example illustrating features and functionality related to various aspects of embodiments of the disclosure. However, the disclosure is not limited to such an example system.

To serve personalized news recommendations, the application package 120 can include schema documents such as a news schema, a user schema, and a services specification. In some embodiments, application package 120 can include a deployment specification and a services specification for setting up the search and recommendation system 100. For instance, a services specification can provision what services to run and how to run the services. A deployment specification can configure a list of hosts/nodes to implement the search and recommendation system 100.

In some embodiments, the news schema can represent news articles by defining a data structure or format for documents comprising news articles. As such, data fed to the search and recommendation system 100 and data returned by the search and recommendation system 100 can both adhere to the schema definition. As an example, the news schema can include a variety of fields associated with respective properties, such as an identifier (ID), a category, a subcategory, a title, an abstract, a body, a uniform resource locator (URL), a click, and the like. In an embodiment, those news schema fields can each be associated with properties or settings such as indexing, attributes, summary, and the like. For example, a property of indexing specifies that the indexing pipeline should be configured for the correspondent field; a property of attributes specifies that the correspondent field should be stored as an attribute for subsequent operations such as sorting, querying, and grouping; and a property of summary specifies that the correspondent field should become part of the document summary in the result set. More details with regard to schemas are described below in conjunction with documents and embeddings.

To recommend personalized news articles, the search and recommendation system 100 can be configured with knowledge of a user's preference in the news, to provide news of interest to the user. In other words, the search and recommendation system 100 can treat recommendations as a search result, where the query is the user profile. For instance, the system can generate user profiles and search for relevant news articles using the user profiles. In some embodiments, the application package 120 can include a user schema to represent such user profiles.

In some embodiments, the search and recommendation system 100 utilizes embeddings to represent both queries and documents so that the search and recommendation system 100 can identify search results based on a vector distance computed for such queries and corresponding documents. Here, in this illustrated example of recommending personalized news, the search and recommendation system 100 can generate embeddings for user profiles and for the news articles. In one example, the search and recommendation system 100 can generate user embeddings based on the information with regard to the categories, subcategories, and/or entities the users have explicitly and/or implicitly interacted with.

Initialized with the embeddings of news articles and embeddings of users, the search and recommendation system 100 can perform a search to render personalized news recommendations to users. In some embodiments, the client 102 can query the container cluster 106 using, for example, Hypertext Transfer Protocol (HTTP) GET or POST requests. In this scenario, the container cluster 106 can return to the client 102 news documents that match the query submitted via the GET or POST requests. In other examples, the client 102 can also issue various queries to the container cluster 106 to perform operations such as selected search, ranking, grouping, and so on. In this scenario, the container cluster 106 may return to the client 102 only the documents that both match the query submitted and qualify under the various filtering factors.

In one example, when serving recommendations in the search and recommendation system 100, the container cluster 106 first retrieves a user embedding corresponding to the user identification provided via, for example, a HTTP GET request. In this case, it is with the user embeddings that the container cluster 106 performs the search for news articles, which are returned to the client 102 as the recommended news for the particular user associated with the user identification provided in the first place. The container cluster 106 may conduct the search using various algorithms such as nearest neighbor search, approximate nearest-neighbors (ANN), hierarchical navigable small world (HNSW) algorithm, etc.

In some embodiments, system 100 can model data as documents. A document may have a string identifier, set by the system 100, unique across all documents. A document may further have a set of key-value pairs. A document may also have an embedded schema (e.g., a document type), defined in the schema. The search and recommendation system 100 can map schemas to one or more of the content clusters 108 in the above-described services specification. The content clusters 108 can store and compute (via content management engine 128) using data stored in the schema. The content clusters 108 can store schemas in files having the same name as the schema in the schemas directory of the application package 120, which can store multiple types of data represented in respective schemas. The container cluster 106 can query all the data stored in the content clusters 108 via distributed query execution component 130.

For example, a news document can be defined in an exemplary schema as follows:

```
schema news {
    document news {
        field news_id type string {
            indexing: summary | attribute
            attribute: fast-search
        }
        field category type string {
            indexing: summary | attribute
        }
        field subcategory type string {
            indexing: summary | attribute
        }
        field title type string {
            indexing: index | summary
            index: enable-bm25
        }
        field abstract type string {
            indexing: index | summary
```

-continued

```
    index: enable-bm25
  }
  field body type string {
    indexing: index | summary
    index: enable-bm25
  }
  field url type string {
    indexing: index | summary
  }
  field date type int {
    indexing: summary | attribute
  }
  field clicks type int {
    indexing: summary | attribute
  }
  field impressions type int {
    indexing: summary | attribute
  }
}
fieldset default {
  fields: title, abstract, body
}
}
```

In various embodiments, the search and recommendation system 100 can source news data and user data (collectively, data) from any suitable data reservoir and store the data in any suitable data reservoir. In the search and recommendation system 100, news data can include news article content, which contains information such as a title, abstract, news category, and entities extracted from the title and abstract. User data can include interaction data such as impressions, which contain, for example, a list of news articles that were shown to a user, labeled with whether or not the user clicked on them.

In some embodiments, the data fed to the search and recommendation system 100 can match the schema for the document type. In some embodiments, a feeder (e.g., feeder 206 of FIG. 2) can convert data into documents having a valid format before input to the system 100. For the above-described example, news data can be transformed into a format compliant with the above-described news schema to generate a plurality of news documents, which are in turn input to the system 100. In various examples, inputting can be done using any suitable technologies such as Hadoop, Oozie, etc.

In the various embodiment, the search and recommendation system 100 can be configured to implement the improved features and functionality of (1) hot swap, (2) multiple models, (3) sharing of model-agnostic data, and (4) removal of old data. However, even though the news recommendation application runs on the search and recommendation system 100, useful building blocks for such an application package 120 are described as non-limiting example to illustrate the handling of various requirements. While some requirements are described independently, certain features can be reused, combined, partially used, or not required to address those requirements.

First, in the various embodiments, the search and recommendation system 100 can hot swap models during runtime. In operation, models utilized by the search and recommendation system 100 can need update as new users and news articles are feed to the system and as more events (e.g., users viewing and clicking news) are collected during runtime. As such, in some embodiments, both user embeddings and news embeddings can be regularly updated on an ongoing basis. Such model updates can be atomic from the users' perspective. For instance, the search and recommendation system 100 can configure a ranking procedure on the search results to not consider embeddings from models different than the ones used for searching. Further, in some embodiments, there may be minimal or no downtime for model updates so that the housekeeping tasks of the search and recommendation system 100 do not negatively impact user experience. In some embodiments, the search and recommendation system 100 can implement hot swapping via version management, as described with reference to FIGS. 2 and 4A, the details of which are incorporated in their entirety.

Second, the search and recommendation system 100 can support multiple models. At runtime, the search and recommendation system 100 can use an initial model to recommend news articles to users based on other users' interactions with those articles, in addition to or independent of recommending news articles based on respective categories, subcategories, titles, content, and the like. This initial model can serve as a base model. However, in some embodiments, two other models can also be implemented: a recent model (e.g., latest model) and a fully read model (e.g., full model). By way of non-limiting examples, the search and recommendation system 100 can generate a recent model to cover events from a recent past period (e.g., in the last day, last two days, last week). The search and recommendation system 100 can pre-configure a duration of the past period used by the recent model. Also, by way of non-limiting example, the search and recommendation system 100 can generate a fully-read model to cover the articles for which the user has scrolled all the way down (e.g., the articles have been fully read by the user, or otherwise assumed that the user has read the entirety thereof). Despite the fact that all these three models pertain to the data of the same users and news articles, and all three models can be generated by the same model generation procedure, each model can include a different set of embeddings. Furthermore, in some scenarios, the search and recommendation system 100 can use multiple models to simultaneously process different queries and feeds. More details with regard to the use of multiple models via versioning management are described with reference to FIGS. 3 and 6 below, the details of which are incorporated in their entirety.

Third, the search and recommendation system 100 can share model-agnostic data among models. In operation, news articles can include both data and metadata that the search and recommendation system 100 can use for filtering (e.g., filtering by title, author, category, subcategory, date, language, and the like). The search and recommendation system 100 can create models, on the other hand, based on events reporting access to the document from specific users. In some embodiments, document data (which depends only on the article and is therefore model agnostic) and event-based model data can be distinguished. Although the search and recommendation system 100 can use document data for filtering (regardless of the model used), there may be no need to replicate this data across the per-model documents. Thus, for example, while the models can rely on user events that may be obtained from a tracking or monitoring system, data corresponding to the model-agnostic fields may be obtained from centralized storage such as a database or a file. De-coupling operations relying on each data source can eliminate issues such as those related to coordination. More details with regard to sharing metadata via versioning management are described with reference to FIG. 4B below, the details of which is incorporated in its entirety.

Fourth, the search and recommendation system 100 can delete models that are outdated or otherwise not in use. During runtime, news articles can be deleted, and users might opt out of the search and recommendation system 100 at any point of time. As the news recommendation system may not rely on or recommend stale data, obsolete entities (and entity models as well as their related data) in the search and recommendation system 100 can be removed. In some scenarios, the search and recommendation system 100 may not delete news articles and users in real time. As such, the search and recommendation system 100 can remove the obsolete data of users and articles with a time delay read from a configuration setting in the application package 120. As one non-limiting example, the search and recommendation system 100 can remove obsolete data using garbage collection. More details with regard to the removal of data via versioning management are described with reference to FIGS. 3 and 5 below, the details of which are incorporated in their entirety.

Figure 2:
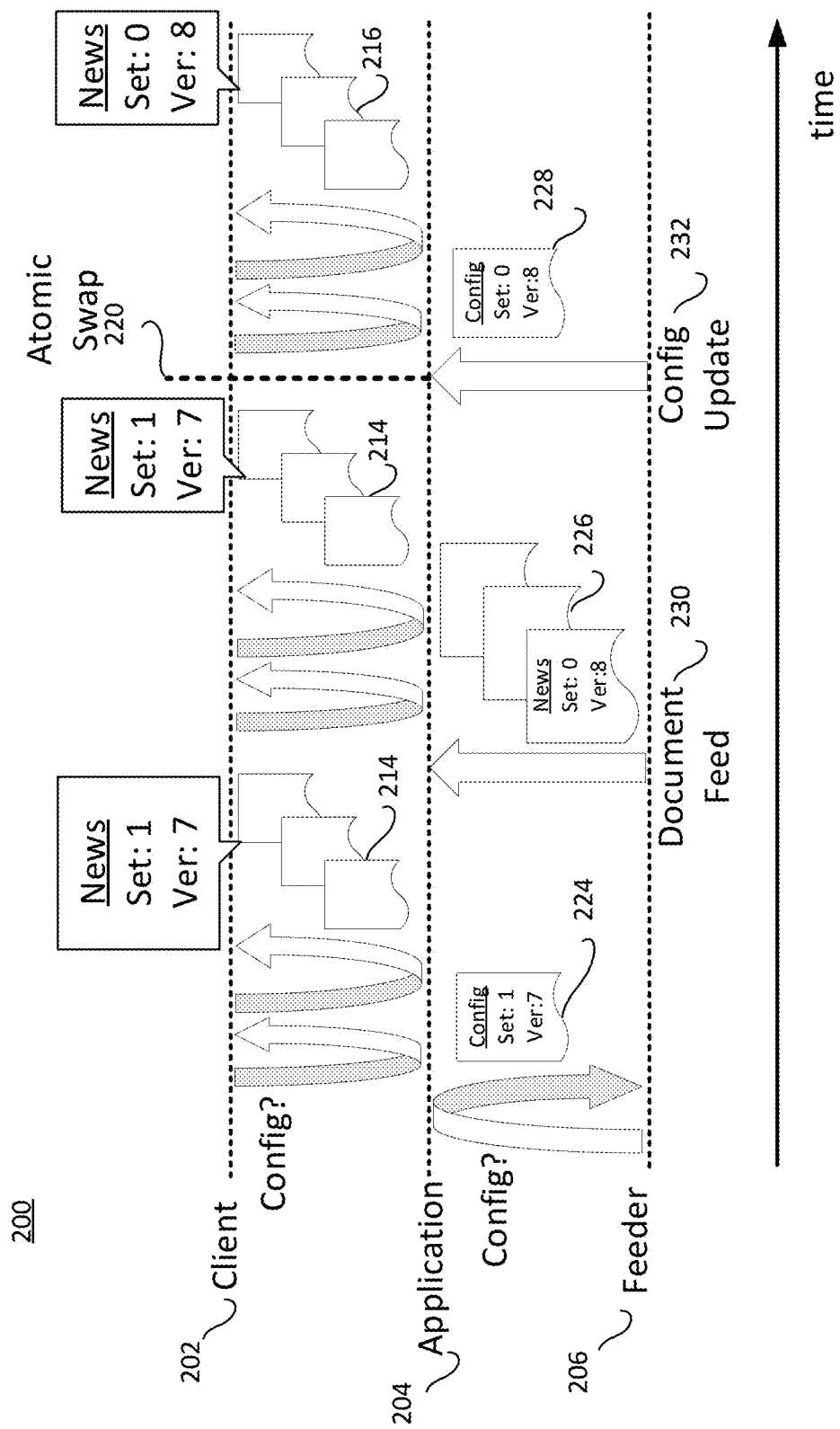
FIG. 2 is a block diagram illustrating an example of versioning according to some embodiments.

FIG. 2 is a block diagram illustrating an example of versioning according to some embodiments.

In one embodiment and as shown in FIG. 2, a news recommendation application 204 (e.g., implemented in search and recommendation system 100 via container cluster 106 and content clusters 108) can communicate with a client 202 and a feeder 206 via a communication network (not shown). As depicted along the horizontal arrowed line indicative of a timeline, the client 202 can query the application 204 for recommended news articles at any point of time while the feeder 206 can update the application 204 with the new models (via configuration update 232) and other relevant data (via documents feed 230) at any point of time, independent of each other.

Here, in this example, the application 204 recommends news articles in response to queries from the client 202. In some embodiments, recommendations are based on a model consisting of two sets of embeddings: user embeddings and news embeddings. To obtain the recommendation, the application 204 first obtains the user embeddings associated with a particular user. Next, the application 204 searches for news articles whose embeddings are closest to the user's embeddings. As an example, the closest news articles can be the most relevant articles for the particular user. In some embodiments, the application 204 can use embeddings in one or more post-search functions such as ranking, filtering, sorting functions.

In general, feeding by the feeder 206 can include uploading a new model to the application 204 via a configuration update 232. In some embodiments, this configuration update 232 triggers an atomic swap 220 by the application 204. In some embodiments, a central requirement for the atomic swap 220 (e.g., hot swap) is atomicity, with which an ongoing query may always see the embeddings belonging to a single model regardless of whether new documents are being fed to the application 204. In implementations, a model may include multiple records. In some embodiments, the application 204 can implement the model swap as an atomic transaction.

In some embodiments, the application 204 can utilize versioning to enable such model hot swap in an atomic transaction. In some embodiments, versioning can enable model isolation to enable model hot swap with atomicity. In some embodiments, versioning can include two parts: an external version and an internal version. In one embodiment, the external version can include a version (e.g., "set" bit) externally defined as part of the document ID. The internal version can include a version stored internally within the document.

In some embodiments, as described above, the application 204 can attach or append an external version to the ID of each document, which may store a single embedding vector.

The document ID separately identifies the documents corresponding to a current model from the documents corresponding to a next model, as well as the documents corresponding to a previous model. This way, multiple documents can be stored at the same time (in a co-existent manner) without overwriting each other.

In some embodiments, the external version can have a limited range such that new documents will overwrite documents belonging to an old model, or an obsolete model. In one embodiment, when the limited range is configured as zero (0) to one (1), the external versions may in fact alternate between zero (0) and one (1). In this manner, the feeder 206 feeds a new model to the application 204, the new model may not overwrite documents pertaining to the current model (including the other external version), but overwrite documents pertaining to a model preceding the current model (including the same external version), which is already obsolete.

In the embodiment of FIG. 2, the exemplary versioning scheme adopted for the documents deploy the above-described set bit alternating between zero (0) and one (1). As illustrated, configuration document 224 has a set bit of one (1); and news document 214 (e.g., corresponding to the configuration document 224) has a set bit of one (1).

In some embodiments, an internal version can also be configured for each document. In one embodiment, the internal version can include a version that is stored inside each document belonging to the model. In some implementations, the feeder 206 can increase this internal version associated with a model upon every feed (e.g., feed 230), thereby allowing queries to only target the current model. This way, the application 204 can filter out the documents pertaining to the next model or previous models using the internal versions.

In the embodiment of FIG. 2, an exemplary versioning scheme adopted for the documents employ the above-described internal version for documents of the system 200. As illustrated, configuration document 224 has a version number (e.g., internal version number "ver"); and news document 214 has a version number (e.g., internal version number "ver") set at seven (7).

Earlier in the timeline, the client 202 running recommendation queries starts by obtaining the configuration document 224 of a target model. The client 202 then adds a filter clause to the following query, limiting it to the current internal version. At this point of time, the configuration document 224 and the news document 214 are both current, both documents having the external version (e.g., set bit) as one (1) and the internal version as seven (7).

In some embodiments, on the side of the feeder 206, the application 204 reads the configuration document 224 and starts a feed. In some embodiments, the configuration document 224 comprises the current configuration document. Next, new news documents 226 are generated such that they have the next internal version and the alternative set. As shown in FIG. 2, news documents 226 have a set bit of zero (0) (the alternate external version or "set" bit), and an internal version of eight (8) (incremented by one from the previous internal version seven associated with the news documents 214). Once the feeder 206 successfully feeds all the news documents 226 to the application 204, the feeder 206 updates the configuration document 224 to a configuration document 228, which has the new internal version eight (8) and the new set bit of zero (0).

Once the configuration document 228 is properly updated with the internal version (0) and the external version (8), from the perspective of the client 202, all the queries subsequently sent to the application 204 use the news document 216 instead of the news document 214. That is, as indicated by the dashed vertical line, the updated configuration document 228 triggers an atomic swap 220 from news documents 214 (e.g., old models) to news documents 216 (e.g., new models) for use in serving recommendations.

Accordingly, prior to the atomic swap 220, the queries and filtering operations from the client 202 can still be performed with the then-current model, e.g., the news documents 214. However, upon the feeder 206 successfully updating the previous configuration document 224 into the new configuration document 228 at the application 204, the model used for servicing requests from the client 202 can be atomically swapped from the news documents 214 into the news document 216. That is, from that point onward, any new search from the client 202 can be performed using the newly fed model.

Additionally, in some scenarios, the application 204 can receive a query from the client 202 before the atomic swap 220 begins and where execution of the query completes after the atomic swap 220 completes. Thus, in such a scenario the atomic swap 220 begins and ends while the query executes. In this case, the documents utilized to match the query can include those of the version configured in the configuration document that is current when the query is received. That is, the news document 214 of version 7 (illustrated in FIG. 2) are still utilized to serve the query, despite the successful atomic swap 220. This way, it can be ensured that, for an execution of a query spanning the transition from an old configuration document (e.g., 224) to a new configuration document (e.g., 228), it is documents associated with the old configuration document, and not the new configuration document, that are used to process the query.

In some embodiments, when an internal write version and internal read version are deployed, upon successful upload, the configuration document can be updated such that the internal read version stores the latest internal write version, and the external version stores the next value. Details of internal write and read versions are provided herein.

Although not illustrated in FIG. 2, in some embodiments, an internal version may include a separate internal write version and/or an internal read version. In one embodiment, an internal read version is used to distinguish between different models at inference time. This can be achieved by filtering out documents that do not contain the targeted version. In one embodiment, an internal write version can be used to distinguish documents pertaining to failed update attempts from documents pertaining to successful updates. More details of the use of an internal write version are described with reference to FIGS. 4A-4B, 5, and 6.

In some embodiments, to ensure an atomic swap, full external versions instead of only set bits can be used to avoid internal versions. In some scenarios, the use of full external versions could create multiple obsolete versions for each document. By including a single set bit in the document ID, it can be ensured that no more than two versions of a document are stored at any given time. On the other hand, using the internal version, old versions that were not overwritten and hence still exist with a set bit that again became current can be filtered out.

In some embodiments, versioning can be stored in a database, a configuration file, or any suitable data storage structure. In one example, the application 204 can store the versioning using an exemplary dedicated type (field) of "version" as illustrated in the following.

```
search config {
    document config {
        field set type int {
            indexing: summary | attribute
        }
        field version type long {
            indexing: summary | attribute
        }
    }
}
```

Figure 3:
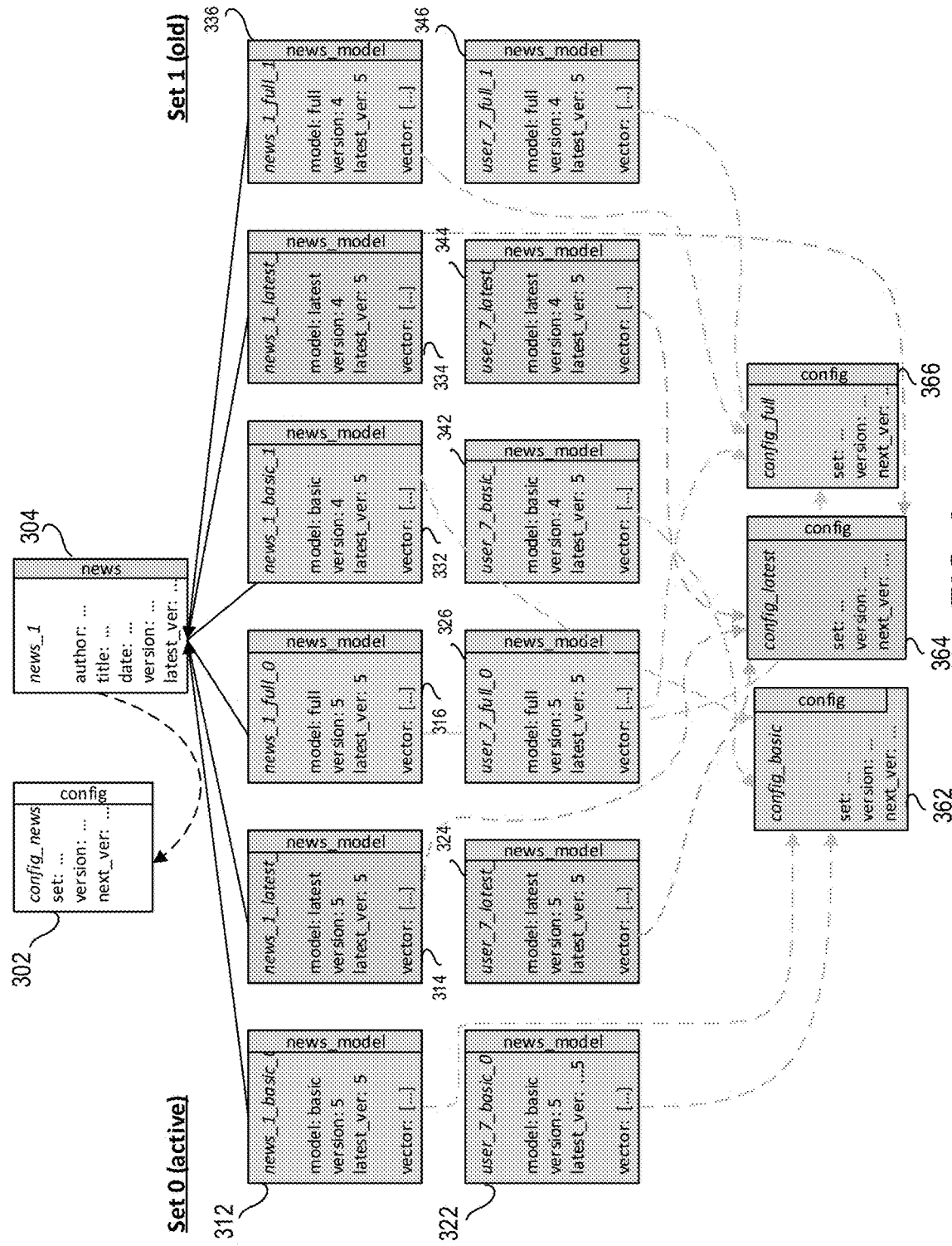
FIG. 3 is a block diagram illustrating an example of versioning with additional new types, fields, and relations in an exemplary news recommendation system according to some embodiments.

FIG. 3 is a block diagram illustrating an example of versioning with additional new types, fields, and relations in an exemplary news recommendation system according to some embodiments.

As illustrated in more details below, the illustrated exemplary features can leverage versioning to improve the management of embeddings and the serving of recommendations. With such improved management and serving ability, the support of multiple models, management of model-agnostic data, garbage collection, handling of unsuccessful feeding, as well as handling of multi-region applications are enabled, can render a search environment highly available, updated often, lean, and efficient.

In some embodiments, the example application 204 can support multiple models. In one embodiment, multiple models can include models corresponding to basic recommendations, recent news recommendations, and fully read news article recommendations. Since the example application 204 can generate those models using the same news articles and user data, the example application 204 can use a model code to distinguish those models. In one example, the model code can be defined in corresponding three categories: basic, recent (latest), and full. In one embodiment, the model code can be stored in two places: (1) in the document ID to prevent documents of different models from overriding each other; and (2) inside the document to allow filtering out documents from other models in the queries. The following illustrates exemplary versioning features further enhanced upon those illustrated in connection with the application 204 of FIG. 2.

As illustrated in FIG. 3, news data can be modeled as a document and represented in news schema. In some embodiments, the following fields (model and version) can be added to the news and user schemas:

```
schema news {
    document news {
        # . . . fields described above with reference to Figure 1 . . .
        field model type string {
            indexing: index | attribute
        }
        field version type long {
            indexing: attribute
            attribute: fast-search
        }
    }
}
```

Here in this illustrated embodiment of FIG. 3, a "news_1" schema 304 can be used to define multiple news (embedding) documents, and a "config_news" schema 302 can be defined to store the above-described versions associated with the news models. As a simplified example, here, the config_news schema 302 can include a set bit, a version number, and a next version number ("next_ver"); and the news_1 schema 304 can include a set of data fields as specified in the exemplary news schema as described above.

Specifically, the news_1 schema 304 can include the data fields illustrated with reference to FIG. 1 (e.g., corresponding to the author, the title, the date), as well as the additional data fields of the version and the latest version ("latest_ver").

In this example, news models (e.g., news models 312, 314, 316, 332, 334, 336, etc.) have the set bit configured as of value either 0 or 1. For example, indicated as the last appended number 0 in their respective model tile (e.g., news_1_basic_0, user_7_latest_0), the news models 312, 314, 316 as well as user models 322, 324, and 326 are shown to have their set bit configured as the value 0; and therefore used by the application 204 as the active or current news models and user models. On the other hand, and also shown here in FIG. 3, indicated as the last appended number 1 in their respective model tile (e.g., news_1_full_1, user_7_basic_1), the news models 332, 334, 336 as well as user models 342, 344, and 346 are shown to have their set bit configured as the value 1. As such, those news documents and user documents can be treated by the application 204 as the old or previous news models and user models.

In some embodiments, news_1 schema 304 can correspond to a plurality of models. Here in this illustrated embodiment, news_1 schema 304 can define three models to be used by the application 204. For instance, in the active set, the news models include a basic model 312 (news_1_basic_0), a recent model 314 (news_1_latest_0), and a full model 316 (news_1_full_0). Similarly, in the old set, the news models include a basic model 332 (news_1 basic_1), a recent model 334 (news_1_latest_1), and a full model 336 (news_1_full_1). In this example, the same model code can be applied to the user documents such that, also similarly, the set zero (active set) of user documents include a basic model 322 (user_7_basic_0), a recent model 324 (user_7_latest_0), and a full model 326 (user_7_full_0); and the set one (old set) of user documents include basic model 342 (user_7_basic_1), a recent model 344 (user_7_latest_1), and a full model 346 (user_7_full_1).

Taking the active basic news model 312 (news_1_basic_0) for example, the active basic news model 312 is shown to have the model code as "basic," the version as "5," and the latest version ("latest_ver") as "5" since version of this particular model is the current one. The vectors representing the embeddings pertaining to this particular model is only shown as vector of "[ . . . ]" for the purpose of simplicity in illustration.

Taking the old basic news model 332 (news_1_basic_1) for example, the old basic news model 332 is shown herein to have the model code as "basic," the version as "4," and the latest version ("latest_ver") as "5", since that is the version of the above-described active basic news model 312, the current one. The vectors representing the embeddings pertaining to this particular model is also only shown as vector of "[ . . . ]" for the purpose of simplicity in illustration.

In this example, since an internal version (e.g., version 5 included in active basic news model 312, and version 4 included in the old basic news model 332) is already stored in each model, this internal version can be combined with the model code. In one embodiment, given that the internal version can also be used for garbage collection, the version number and the model number can be stored apart to simplify other tasks.

In some embodiments, each of the illustrated models can be generated using a different dataset. Thus, the feeding procedures of each model can be separated accordingly. In some embodiments, each model can have a separate configuration that stores (e.g., possibly) different internal versions and external versions (e.g., sets) pertaining to the particular model. In this example, config_basic document 362, config_latest document 364, and config_full document 366 can record of a copy of the version information corresponding to the basic model, latest model, and full model.

Continuing with this illustrated example with the three models (e.g., basic, latest, and full models) of FIG. 3, each document has six instances at any given moment, namely, three (3) different models multiplied by two (2) sets (e.g., active and old sets). As most of the news article data is model agnostic, a single instance of that data can be used by all models. Further, the events used to create the prediction models (e.g., tuples like <user ID, news ID, date, fully_read>) come from a different source than the news article data; hence it can be advantageous to process and/or feed those event data separately. As used herein, data that can be used (e.g., processed, fed, or the like) in connection with multiple models is referred to as model-agnostic data. For instance, the above-described news article data may be treated as model-agnostic data while the event data for creating prediction models may not be treated as model-agnostic data.

Any techniques that provide detachment or separation between documents can be applied the above-described sharing of metadata across models. In one embodiment, to enable document instances to share the model-agnostic data, parent-child relations can be used. In some implementations, model-related fields may be extracted into a new schema called news_model to capture those data fields that are model-agnostic. All the other remaining fields can be kept in a news schema, and a reference is added from the news schema to the news_model schema. This reference allows importing the data fields from the parent (e.g., shared, model-agnostic) document to the child (e.g., model) document. At the same time, the model-agnostic data searchable and retrievable can be searchable as if it were part of the model document. The following illustrates an exemplary definition of a news_model schema.

```
schema news_model {
    document news_model {
        field embedding type tensor<float>(d0[51]) {
            indexing: attribute
            attribute {
                distance-metric: euclidean
            }
        }
        field model type string {
            indexing: index | attribute
        }
        field version type long {
            indexing: attribute
            attribute: fast-search
        }
        field news_ref type reference<news> {
            indexing: attribute
        }
    }
    import field news_ref.title as title { }
    import field news_ref.language as language { }
}
```

As shown in the above exemplary schema, the shared news schema may neither store the model vector nor have a model field, both of which are model-specific. However, it has a version field that can be obtained from, for example, a dedicated news configuration. In some embodiments, the dedicated news configuration can be implemented using the config_basic document 362, config_latest document 364, and config_full 366 documents illustrated in FIG. 3. This version is used only for garbage collection of removed documents, as described further herein and below.

Still using the versioning for a news recommendation system illustrated in FIG. 3, another feature enabled in the application 204 is to perform cleanup operations on the application. As described above, in FIG. 3, two sets (e.g., active and old sets, set 1 and set 2) are maintained in a per-model fashion such that version 1 goes to set 1, version 2 goes to set 0, version 3 goes to set 1, and so on. In one example, a news article that has been deleted by its author before a version 3 model was created is assumed. After feeding the version 3 model to the application 204, set 1 will include the up-to-date articles associated with the version 3 model, but will also still include the deleted article associated with, for example, the version 1 model. In some embodiments, queries may further provide filtering criteria such as by version and hence the deleted article can be ignored in the recommendation. Nevertheless, the deleted news article can be removed from the application 204 to avoid gathering obsolete data therein over time.

In some embodiments, the application 204 itself may provide a built-in garbage collection (GC) mechanism. For instance, a GC mechanism can use a filter that determines which documents to include in the application 204, or consequently which documents to remove from application 204. In one embodiment, the GC can detect up-to-date documents based on their internal version. In general, the filter expression is specified in the application settings, while the actual versions of interest change with each feeding to the application. In some embodiments, a solution to the obsolete document problem introduced by the feeding operations may be provided by leveraging the above-described parent-child relations.

In one embodiment, each document can form a parent-child relation with its model configuration document (e.g., config_basic document 362, confing_latest document 364, and config_full document 366) such that to import the version field, which can be renamed to, for example, latest_version (e.g., latest_ver of these news models and user models illustrated in FIG. 3). As a result, each document can have two version fields: the one with which it was created and the one imported from the configuration. In contrast, the former version is fixed and may never change (e.g., it is assigned uniquely to the particular document), the latter version can change at each time upon the configuration being updated. For example, as imported fields can comprise references to the fields in the parent document, these fields don't store the actual data but pointers or links to the actual data stored in the parent document. To further include the latest version field, the relevant portions of the user schema and news schemas can be defined to include a field of "import" as the following example.

```
field version type long {
   indexing: attribute
   attribute: fast-search
}
field config_ref type reference<config> {
   indexing: attribute
}
import field config_ref.version as latest_version { }
```

In one embodiment, with this additional field of an imported latest_version, up-to-date documents and obsolete documents can be distinguished by comparing the version field and latest_version field. For instance, if these two fields are of the identical number (e.g., version field data is equal to the latest_version field data), the document is part of the latest feed. On the other hand, if these two fields are not of the identical number (e.g., version field data is not equal to the latest_version field data), the document is not part of the latest feed.

In one embodiment, a difference in these two versions may be briefly acceptable during a hot swap, where ongoing queries should still access documents from the set that is soon to became old, upon a successful hot swap that might be in progress. Therefore, in some embodiments, a filter definition may be relaxed to accommodate this brief discrepancy. The following illustrates an exemplary filter definition:

```
documents garbage-collection="true"
      garbage-collection-interval="21600">
   <document mode='index' type='config' global='true'/>
   <document mode='index'
      type='news'
      global='true' selection=
      '(news.latest_version == null) or
         (news.version >= news.latest_version − 2)'/>
   <document mode='index'
      type='news_model'
      selection=
         '(news_model.latest_version == null) or
         (news_model.version >= news_model.latest_version − 2)'/>
   <document mode='index'
      type='user'
      selection=
         '(user.latest_version == null) or
         (user.version >= user.latest_version − 2)'/>
</documents>
```

In the above example, the filter compares the news documents' versions via the operation of "news_model.version>=news_model.latest_version-2", and the user documents versions via the operation of "(news.version>=news.latest_version-2". It should be noted here that the filter not only compares the internal and latest_versions, but also checks whether the respective latest_version is null. This may be required as the filter is also applied during feeding. At that point, the reference to the configuration document isn't active yet, hence all imported fields can contain null values. Without the null check, all documents would be filtered out during feeding.

In one embodiment, an automated feeding workflow can start by obtaining the target version for the next feeding from the configuration, feed the application 204, but run into failure before a hot swap is completed. Since the configuration wasn't updated successfully, no query will be serviced by the application 204 using this first set of documents that were just fed but failed to update the application 204. At a subsequent point of time (e.g., the next day or according to the automated schedule), the feeding workflow can start again, but this time with the next day's model. During the day that passed, there are users and articles removed from the system, hence those deleted news articles and users are not included in the new model. That is, the first set of documents fed to the application 204 without achieving a successful update may not be the same set of documents in the new model. In this example, the feeding completes successfully this time, leading to a successfully executed hot swap. In such a scenario, the system can enter a problematic state where the current model includes a current day's model, along with the articles and users that were removed during the previous day, all sharing the same version and all accessible to queries.

In some embodiments, to address this scenario, unsuccessful feeds can be configured with distinct versions as well, thus being separated from the following successful feeds. However, this may not be achieved using a single version. For instance, several unsuccessful attempts might take place before one goes well, during which queries should keep using the latest successful version by referencing that version number.

In one embodiment, an exemplary embodiment can separate read versions and write versions. In one example, at the beginning of every feed, the write version can be incremented, and the result can be stored back in the configuration for use in all the model documents. Once a feeding completes successfully, the configuration document can be updated again to set the read version to the write version. This way, any leftover, intermediary, or previously used documents from unsuccessful feedings will have smaller versions, which can be ignored by queries. In some embodiments, the active set may only be modified after a successful feed, otherwise the hot swap can be corrupted by overwriting the currently active set.

In one embodiment, the configuration schema having the additional field can be defined to include the field of "next version" in the following example schema. In some embodiments, the "version" field may store the internal read version as illustrated with reference to FIG. 2 and the "next version" field may store the internal write version also as illustrated with reference to FIG. 2. Here, as shown in config_news schema 302, config_basic document 362, config_latest document 364, and config_full document 366, the new next_version (e.g., next_ver) field is added to store the write version and the previously defined version field (e.g., imported for GC) for the read version.

```
search config {
    document config {
        field set type int {
            indexing: summary | attribute
        }
        field version type long {
            indexing: summary | attribute
        }
        field next_version type long {
            indexing: summary | attribute
        }
    }
}
```

In one embodiment, the application 204 can be deployed to multiple regions to ensure availability in case data or operations in one of the regions cannot be reached. From the searching perspective, a single global endpoint can be used, and calls/queries are automatically redirected to one of the regions. From the feeding perspective, however, each region must be fed separately. In one exemplary faulty scenario, one of the regions becomes temporarily unavailable and therefore, its daily feeding fails, while another region is successfully fed as usual. Absent features to provide for further robustness to the application 204, a discrepancy between the regions can lead to issues.

For example, the discrepancy can lead to version mismatch. Since each region had a different number of successful feedings, each region will have a different current version. Given the global endpoint can go either way, a user getting the version from a configuration in one region might be directed to a different region when performing the recommendation query.

As another example, the discrepancy can lead to model mismatch. Even if the versions somehow converge, the models themselves might differ when one region isn't fed (possibly due to a feeding issue). Again, recommendations can be based on two steps: first, the user's vector (embeddings) is obtained, and then a dot product with each news article is performed. If the user vector is obtained from one region, ranking is performed on another, and the models don't match, the result might be meaningless.

In some embodiments, a configuration can be augmented to ensure that all queries directed to the application 204 for a recommendation, retrieval of the versions, retrieval of the user vector, and performing the ranking and the like are done in the same region. In one embodiment, the sequence of searches can be implemented in, for example, the application's Searcher class. In this case, a single call will be required. If the sequence of searches is better implemented at the client side (e.g., to integrate some business logic), the client 202 should use the per-region endpoint. While the global endpoint can be used for the configuration query (e.g., load balancing, location, availability, etc.), the global endpoint provides no way to know which particular region the following queries should be sent to.

In some embodiments, such desired "stickiness" can be achieved by extending the configuration by adding a region endpoint field to the configuration schema. Next, in each region's configuration document, the system can store the region's endpoint (each region has a separate configuration document, which can store different values). When retrieving the version using the global endpoint, a region endpoint can be obtained and used in follow-up queries instead of the global endpoint.

Figure 4A:
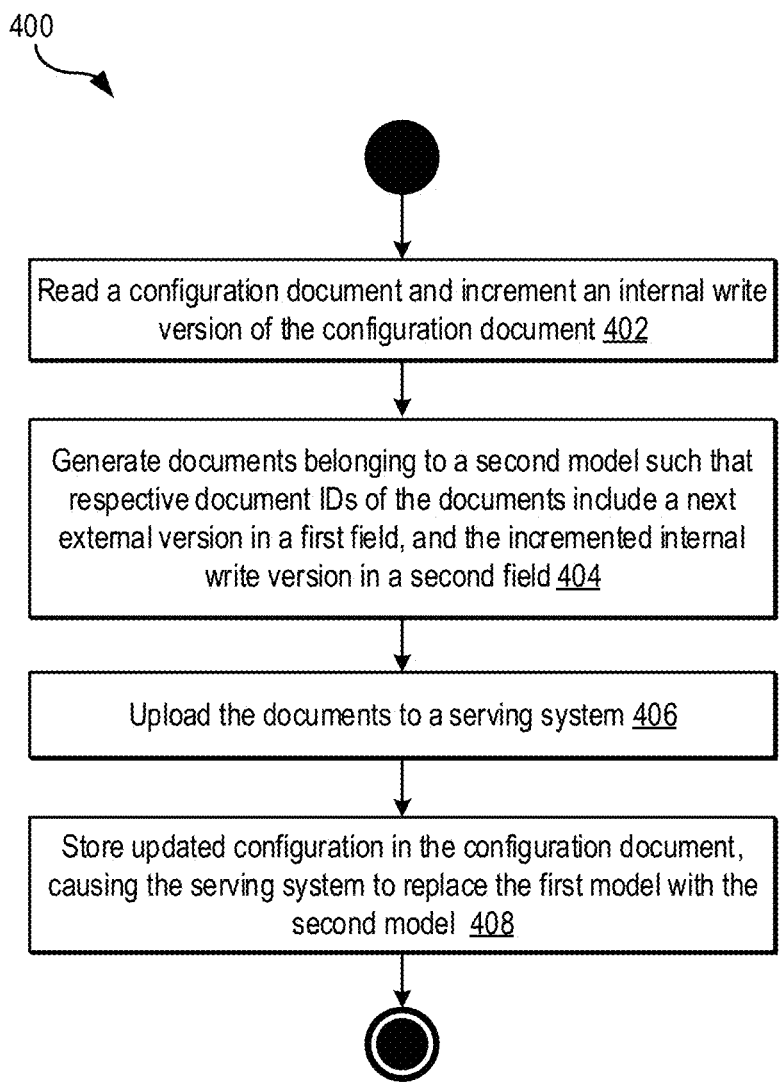
FIG. 4A is a flow diagram illustrating a method for performing a hot swap update on model-specific data according to some embodiments.

FIG. 4A is a flow diagram illustrating a method for performing a hot swap update on model-specific data according to some embodiments.

In some embodiments, an updater process, such as a dedicated program, a configurable workflow engine, or the like can perform the method 400. In one embodiment, a user can manually start the method 400, while in other embodiments the updater process can perform the method 400 automatically. In various embodiments, the method 400 can be triggered by events that, for example, update the user embedding, the news embeddings, and the like.

In step 402, the method 400 can comprise reading a configuration document and incrementing an internal write version of the configuration document. In one embodiment, the method 400 can associate the configuration document with a first model. As a non-limiting example, the first model can comprise a news model, a user model, or the like as described above. In an embodiment, the configuration document can include an internal write version and an external version. The internal version and the external version can be similar to those versions described above. For instance, the method 400 can configure the external version with a limited range, such as zero to one. Using the embodiment illustrated in FIG. 2 as an example, here in step 402, the method 400 can read the configuration file having a set of one (1) and a version number (e.g., a "ver" number) of seven (7); and update the version number (e.g., the internal write number) from seven (7) to eight (8). In this example, the method 400 can be initiated into step 402 upon the feeder successfully performs a document feed to update the news embeddings with the versioning information having a set of zero (0) and a new version number of eight (8).

In step 404, the method 400 can comprise generating documents belonging to a second model such that respective document IDs of the documents include a next external version in a first field, and the incremented internal write version in a second field. Still using the embodiment illustrated in FIG. 2 as an example, once the feeder successfully updates the news embeddings for use by the system, the new news embeddings becomes the second model. As described above, the method 400 can associate documents belonging to a model with the respective external version and internal version (write and read). Using the external version and the internal write version of the configuration document, the method 400 can include a next external version relative to the external version of the configuration document in the document IDs. For example, if the external version obtained (e.g., the set bit described above and in the embodiments illustrated in FIGS. 2 and 3) from the configuration document is 0, the version used the documents will be 1 given the method 400 can configure the external version to alternate (cycle) between 0 and 1 (e.g., set bit of 0 or 1). On the other hand, the method 400 can store the incremented internal write version of the configuration document in the documents. As described above, the method 400 can use a second field specified according to a schema of the second model to store the incremented internal write version. For example, the method 400 can store this write version as an internal version. In the embodiment illustrated in FIG. 2, the set bit of the new configuration document can be updated from the prior set value of one (1) to the next set value of zero (0), and thereby indicating that the new configuration document is to be the active configuration document for use given the new news embeddings already successfully uploaded. That is, in this example, the data field for storing the set value is the first data field; while the data field for storing the version number is the second data field. In one embodiment, and as illustrated in FIG. 3, the method 400 can also store a model ID as an indexed field within each document (e.g., news_1_basic_0).

In some embodiments, the documents of the second model can store only model-related data, which comprises updated embeddings. Shared documents associated with the second model can store only model-agnostic data. As above described with reference to FIG. 1, non-limiting examples of model-agnostic data can include data of entities related to metadata of interest (e.g., user location, date, author, title, and ad type), data shared by models of the entities but retrieved from a separate source than the models; and the like. In some embodiments, the method 400 can occasionally update the shared document non-atomically. In one embodiment, the method 400 can reference shared documents using parent-child relations from the model documents. In another embodiment, model-agnostic fields can be available in all instances of the model documents without duplicating them, minimizing the space overhead required for model hot-swap. More details are described with reference to FIG. 4B, below.

In step 406, the method 400 can comprise uploading the documents to a serving system, causing the serving system to replace the first model with the second model. In some embodiments, the second model can replace the second model as a current model used to serve recommendations. In one embodiment, when stored in the serving system, the documents overwrite the documents previously stored and having the same external version. However, those documents can be guaranteed to be obsolete (assuming no query will last long enough to see two model updates given common query timeout limitations). In some embodiments, the documents may be uploaded immediately after being generated; or temporarily stored for a future batch upload. In the embodiment illustrated in FIG. 2, here in step 406, the method 400 can perform a configuration update by, for example, uploading the new configuration having the new set value of zero (9) and the new version number of eight (8). As a result, in this example, the subsequent search and recommendation queries submitted to the system are served, via referencing the new configuration document atomically swapped in, using the most current news model (e.g., the second model) having a new set value of zero (0) and a new version number of eight (8), in place of the old news model (e.g., the first model). That is, the new news model can replace the old news model in an atomic manner.

In step 408, the method 400 can comprise storing updated configuration in the configuration document. Here, since the method 400 can increment the internal write version to a new value, the method 400 can store the new value of the internal write version in the configuration document as update configuration. Again, using the embodiment illustrated in FIG. 2 as an example, here in step 408, the method 400 can record the updated version number eight (8) in the configuration document. As a result, the most current configuration can include a set of zero (0) (i.e., external version) and the internal version number of a new value of eight (8).

In some embodiments, upon successful completion, the method 400 can update the configuration document. In one embodiment, the method 400 can update the configuration document such that an internal read version of the configuration document stores the incremented internal write version, and an external version of the configuration document stores a next value. Using the above-described exemplary external version, if the previous external version obtained from the configuration document is 0, the external version in the updated configuration document can be 1.

In some embodiments, upon unsuccessful completion, the method 400 can conclude the updating process without allowing any of the partially uploaded documents to be used in serving recommendations (e.g., render no impact from a failed upload of documents). In one embodiment, the updating process can conclude immediately upon unsuccessful completion. However, in some embodiments, the method 400 can temporarily store the partially uploaded models.

In one embodiment, the method 400 can further read the configuration document to obtain an internal read version, and filter accesses to the second model's documents during an inference by the serving system such that only documents storing the read version are utilized.

In some embodiments, the method 400 can further detect and discard obsolete documents in the serving system. In one embodiment, the method 400 can implement the detecting and discarding obsolete documents by: separating the documents into discrete sets so that a majority of old documents are automatically overwritten in each model update and need not be explicitly discarded; detecting documents that have not been overwritten by comparing their internal read version to the current internal read version in the configuration; when the serving system supports parent-child relations, each document references its configuration document and imports its read_version field as latest_version; and when the serving system provides automatic garbage collection based on a predefined filter, using the filter to compare each document's read_version and latest_version fields, and discard the document if the difference is larger than one.

Figure 4B:
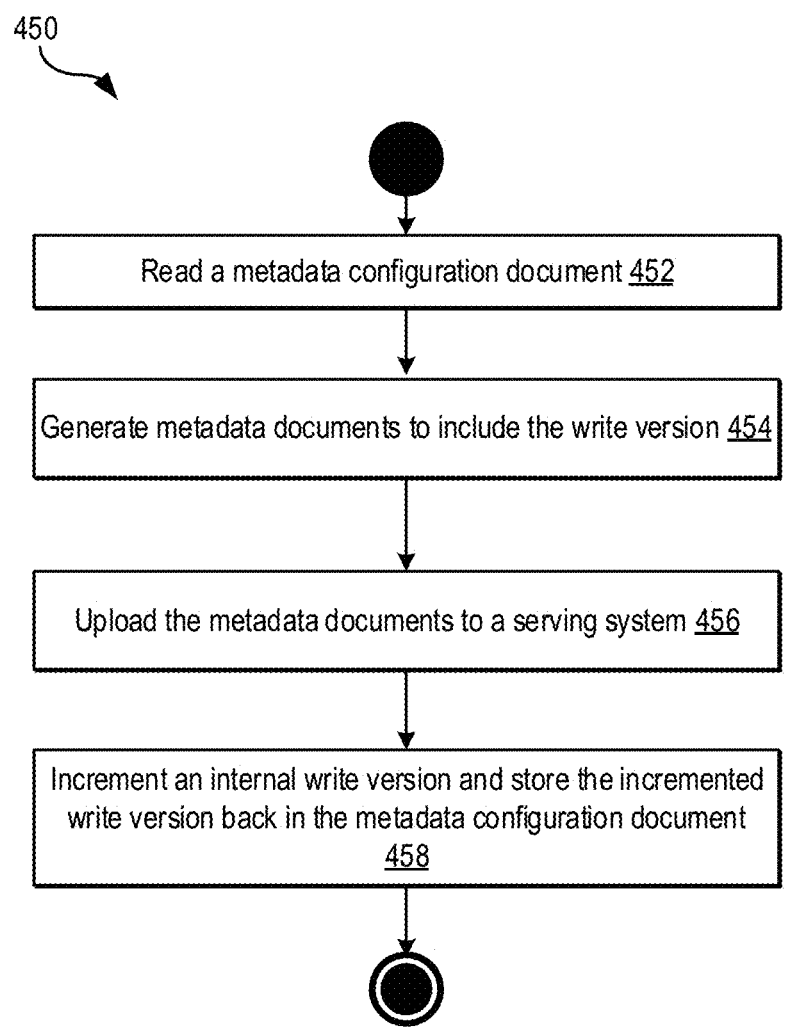
FIG. 4B is a flow diagram illustrating a method for updating model-agnostic data according to some embodiments.

FIG. 4B is a flow diagram illustrating a method for updating model-agnostic data according to some embodiments.

In some embodiments, an updater process, such as a dedicated program, a configurable workflow engine, or the like, can perform the method 450. In one embodiment, the updater process can execute method 450 manually or automatically. In the following, the method 450 is illustrated with metadata as exemplary model-agnostic data. In various embodiments, the model agnostic data can include any data shared between models.

As described above, a system can store metadata separately from the model data. In those scenarios, versioning techniques of the disclosure can be applied to update, manage the model-agnostic documents as well. In one embodiment, the method 450 can use a parent-child reference (e.g., relationship) to link the metadata documents pertaining to models and model data documents. In other embodiments, any suitable referencing techniques may be used as long as the model-related documents and corresponding metadata document(s) can be linked for identification and updating. This way, and unlike model-related (model documents) documents, the metadata documents need not be hot swapped atomically, as each document's metadata is unrelated to other documents. Therefore, in some embodiments, the method 450 can safely update metadata documents one by one, without breaking the integrity of the models. In some embodiments, the generation of the metadata documents can serve the effect of de-duplicating data in the system since the shared data are consolidated into metadata documents having the capability to link one copy of the shared data to multiple model data documents. By configuring model-agnostic fields as available in all instances of the model documents without duplicating them, computing resources utilized in the system can be reduced. For instance, the storage space overhead required for model hot-swap is reduced, if not minimized.

In step 452, the method 450 can comprise reading a metadata configuration document. In one embodiment, the metadata configuration document can include an internal write version. In some embodiments and as described above with reference to FIG. 1, model-related fields may be extracted into a new schema called news_model to capture those data fields that are model-agnostic. All the other remaining fields can be kept in a news schema, and a reference is added from the news schema to the news_model schema. This reference allows importing the data fields from the parent (e.g., shared, model-agnostic) document to the child (e.g., model) document. In one example, the shared news schema may neither store the model vector nor have a model field, both of which are model-specific. However, it has a version field that can be obtained from, for example, a dedicated news configuration. In some embodiments, the dedicated news configuration can be implemented using, for example, the config_basic document, config_latest document, and config_full documents illustrated in FIG. 3.

In step 454, the method 450 can comprise generating metadata documents to include the write version. In one embodiment, since there's a single (e.g., shared) instance of each metadata document, the method 450 may not include external versions in the metadata documents. For example, for the exemplary news models illustrated in both FIGS. 2 and 3, the corresponding metadata document may not include a set bit in the versioning management to indicate whether the metadata document is the currently active one. That is, in this example, the metadata document can be the only document for use in association with its corresponding model documents.

In step 456, the method 450 can comprise uploading the metadata documents to a serving system. In one embodiment, via the upload, the metadata documents can overwrite the existing metadata documents and therefore become immediately accessible. In some embodiments, in the parent-child relations among document as above described, updated information in the replacing metadata document can propagate (e.g., via the import field) to respective model documents to effectuate the updates.

In step 458, the method 450 can comprise incrementing the internal write version and store the incremented write version back in the metadata configuration document. In one embodiment, since the method 450 can increment the internal write version to a new value, the method 450 can store the new value of the internal write version in the metadata configuration document as update metadata configuration. Similarly, the method 450 can also update an external version of the metadata configuration document to a next value and store the next value of the external version in the metadata configuration document as update metadata configuration. Using the above-described exemplary external version as a non-limiting example, if the previous external version obtained from the meta configuration document is 0, the external version in the updated meta configuration document can be 1.

In some embodiments, upon the method 450 uploading the metadata documents, the method 450 can comprise updating the metadata configuration such that the read version of the metadata configuration is set to the write version's value.

Figure 5:
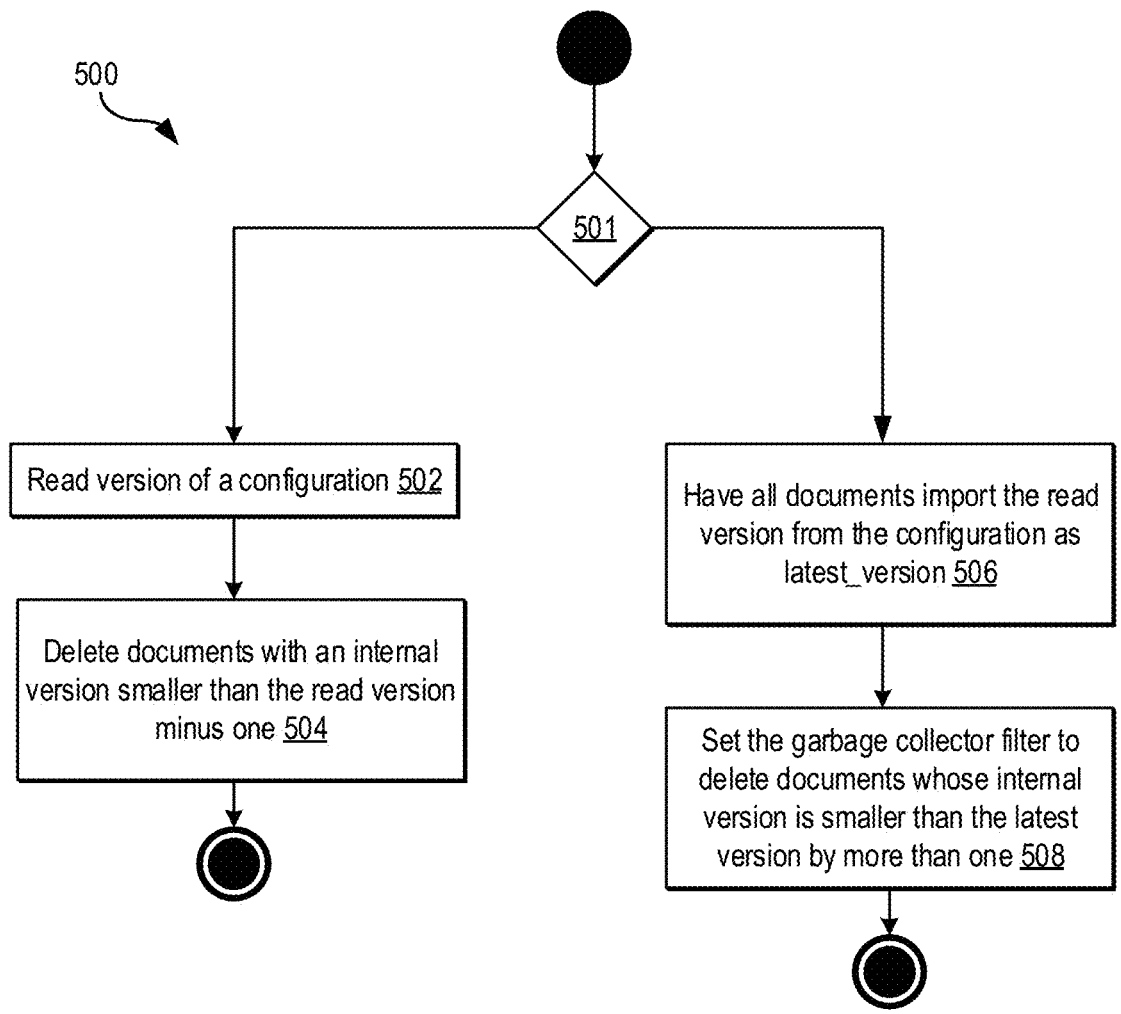
FIG. 5 is a flow diagram illustrating a method for garbage collection of model data according to some embodiments.

FIG. 5 is a flow diagram illustrating a method for garbage collection of model data according to some embodiments.

In some embodiments, data storage programs such as databases can offer batch deletion via commands (e.g., ad-hoc commands) based on conditions such as a filter. For example, a command of "delete all documents with version smaller than 42" can be executed against a database storing documents that have version numbers. However, some search environments may not support command line-based batch deletion, or any form of batch deletion based on a filter. For instance, some search environment may alternatively only support a deletion command with parameters indicating the identity of documents are to be deleted. Instead, those search systems provide a built-in garbage collection mechanism that can use a predefined filter, which can be configured when the search application is deployed. Embodiments herein describe a different solution to each type of mechanism. In some embodiments, the method 500 can be applied to both model (or, model-related) documents and model-agnostic documents. In some embodiments, the method 500 can be applied to each type of document separately when the documents have different configurations.

In step 501, the method 500 can comprise determining whether a search system utilizes an ad-hoc deletion mechanism or a built-in garbage collection mechanism to remove files that are of older versions, or no longer needed or used in the search system. An ad-hoc deletion mechanism can include the above-described batch deletion of documents using a deletion command in conjunction with parameters associated with the intended deletion. A build-in garbage collection mechanism can include various GC techniques such as, for example, conservative garbage collector, generational garbage collector, and the like.

If the method 500 determines that the search system utilizes ad-hoc deletion mechanism, the method 500 can proceed to step 502. If, however, the method 500 determines that search system utilizes built-in garbage collection mechanism is used, the method 500 can proceed to step 506.

In step 502, the method 500 can comprise reading a read version of a configuration. Details of the read version are similar to the versioning in the embodiments illustrated with reference to FIGS. 2 and 3 and therefore are not repeated herein.

In step 504, the method 500 can comprise deleting documents with an internal version smaller than the read version minus a preset difference (e.g., 1 or 2). For example, if the read version of the configuration is 42, the method 500 may delete all the documents having a version number equals to or smaller than 40. In one embodiment, documents with a version number of 41 might still be required in the case where a hot swap has just occurred (e.g., still in the middle of progress and not yet completed, but has not failed), and ongoing queries still have to use the previous model, which relates to the documents of a version number 41. In various embodiments, the preset difference can be configured as any number or a range of numbers, according to any suitable circumstances and system requirements. This way, the method 500 can provide the system with sufficient yet configurable fall back version(s) of the configuration documents for speedy recovery in the event of unexpected upload failure of the configuration documents.

On the other hand, when determining that a built-in garbage collection filter is used for garbage collection, in step 506, the method 500 can comprise having all documents import the read version from the configuration as "latest_version", using, for example, parent-child relation.

In step 508, the method 500 can comprise setting the garbage collector filter to delete documents whose internal version is smaller than the latest_version by more than one. In some embodiments, similar to the example illustrated above for the ad hoc deletion commands, a preset difference can be configured to specify which smaller version numbers signal deletion by the method 500 to perform GC. Also similarly, the preset difference can be configured as any number or a range of numbers, according to any suitable circumstances and system requirements. Empowered with such sufficient and yet configurable fall back version(s) of the configuration documents, the method 500 can provide the system with speedy recovery in the event of unexpected upload failure of the configuration documents.

Figure 6:
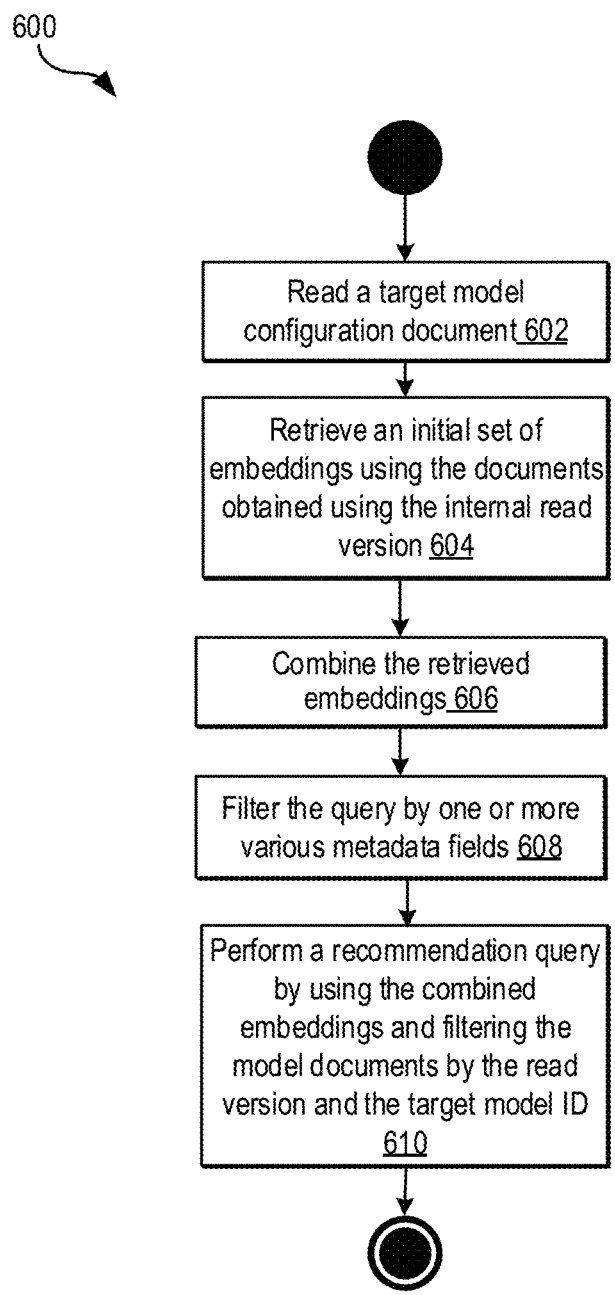
FIG. 6 is a flow diagram illustrating a method for serving model-based recommendations using multiple models according to some embodiments.

FIG. 6 is a flow diagram illustrating a method for serving model-based recommendations using multiple models according to some embodiments.

As described above with reference to FIG. 1, in some embodiments, embedding-based queries can entail multiple accesses to a serving system. For instance, finding ads similar to a given set of ads can require multiple accesses to the serving system. In this example, the embeddings of the input ads can be obtained first from the serving system and then combined into a single vector. Afterward, the serving system can be queried again for the ads whose embeddings are closest to the combined vector. For this procedure to be correct, the same model should be used on all stages of access to the serving system, despite whether a new model has been uploaded in parallel (in the meantime) to the serving system.

As such, a multi-step search process can involve multiple accesses to a serving system, with the ensured use of a single model regardless of whether a model is updated during the search. In one embodiment, the search process can involve the steps of obtaining required embeddings, combining the embeddings to produce a single embedding vector, and using the merged embedding vector to find similar embeddings. In essence, this search process can be implemented as a nearest neighbor (NN) search for some groups of entities modeled by the serving system.

In step 602, the method 600 can comprise reading a target model configuration document. In one embodiment, the method 600 can obtain an internal read version of the target model configuration document. Details of the internal read version are similar to the versioning in the embodiments illustrated with reference to FIGS. 2 and 3 and therefore are not repeated herein.

In step 604, the method 600 can comprise retrieving an initial set of embeddings using the documents obtained using the internal read version. In one embodiment, the method 600 can retrieve an initial set of embeddings based on one or more of: respective (e.g., known) IDs, respective target model ID, or respective internal versions on the condition that the retrieved embeddings have a version matching the read version obtained in step 602. In some implementations, an external version is not needed, as each internal version is used once. Alternatively, in some embodiments, the method 600 can comprise retrieving an initial set of embeddings using the documents obtained using the external version.

In step 606, the method 600 can comprise combining the retrieved embeddings. In various embodiments, the method 600 can combine the embeddings in any suitable manners, which include, for example, by performing an averaging operation on the set of embeddings via various techniques and algorithms.

In step 608, the method can first filter the query by one or more various metadata fields. In one embodiment, the metadata fields used for filtering can include a metadata type. For instance, to serve recommendations, the method 600 can consider only ads of a certain type such that all other ads are filtered out before being used in the embeddings-based ranking. Here, the ad type can be a non-limiting exemplary metadata type. In one embodiment, using the candidate documents filtered in step 608, the method 600 can match the commendation query with a list of documents ranked based on ranking scores computed with regard to the recommendation query. In some embodiments, ranking can be performed using a rank profile that specifies various ranking functions of various ranking features. In some embodiments, ranking features can include values and/or values computed from queries, documents, and constant values, and the like.

In step 610, the method 600 can comprise performing a recommendation query by using the combined embeddings and filtering the model documents by the read version and the target model ID. In some embodiments, steps 608 and 610 can be performed simultaneously and are thus not limited to being executed sequentially as illustrated in FIG. 6.

In some embodiments, since in steps 602 and 604 the method 600 can use the same read version, they are guaranteed to use the same set of embeddings. Also, the target model ID can be used to distinguish between different models representing the same entities.

Figure 7:
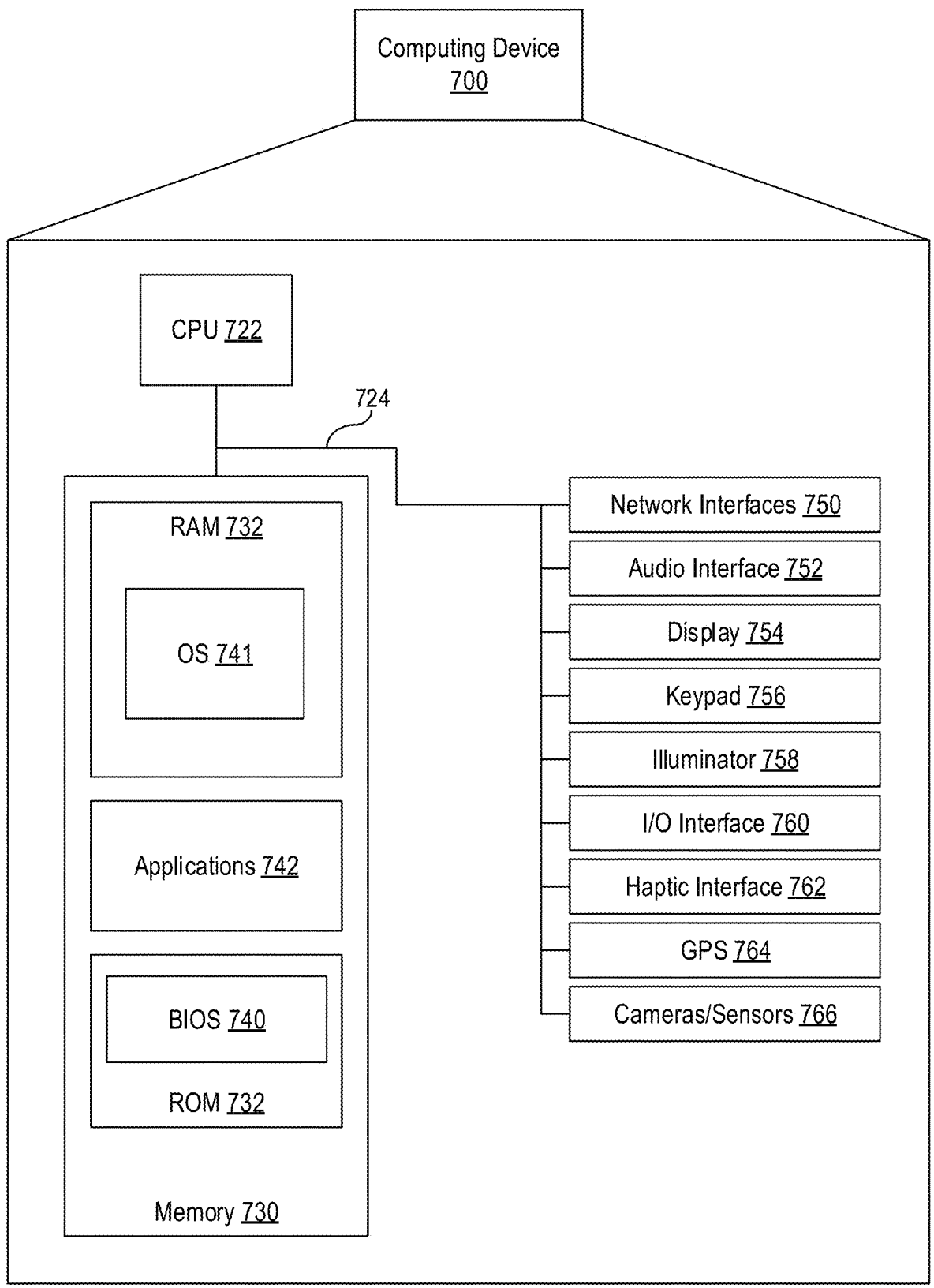
FIG. 7 is a block diagram illustrating a computing device used in the various embodiments of the disclosure.

FIG. 7 is a block diagram illustrating a computing device showing an example of a client or server device used in the various embodiments of the disclosure.

The device 700 may include more or fewer components than those shown in FIG. 7, depending on the deployment or usage of the device 700. For example, a server computing device, such as a rack-mounted server, may not include audio interfaces 752, displays 754, keypads 756, illuminators 758, haptic interfaces 762, Global Positioning System (GPS) receiver 764, or cameras/sensors 766. Some devices may include additional components not shown, such as graphics processing unit (GPU) devices, cryptographic co-processors, artificial intelligence (AI) accelerators, or other peripheral devices.

As shown in the figure, the device 700 includes a central processing unit (CPU) 722 in communication with a mass memory 730 via a bus 724. The device 700 also includes one or more network interfaces 750, an audio interface 752, a display 754, a keypad 756, an illuminator 758, an input/output interface 760, a haptic interface 762, a global positioning system, or GPS receiver 764 and a camera(s) or other optical, thermal, or electromagnetic sensors 766. Device 700 can include one camera/sensor 766 or a plurality of cameras/sensors 766. The positioning of the camera(s)/sensor(s) 766 on the device 700 can change per device 700 model, per device 700 capabilities, and the like, or some combination thereof.

In some embodiments, the CPU 722 may comprise a general-purpose CPU. The CPU 722 may comprise a single-core or multiple-core CPU. The CPU 722 may comprise a system-on-a-chip (SoC) or a similar embedded system. In some embodiments, a GPU may be used in place of, or in combination with, a CPU 722. Mass memory 730 may comprise a dynamic random-access memory (DRAM) device, a static random-access memory device (SRAM), or a Flash (e.g., NAND Flash) memory device. In some embodiments, mass memory 730 may comprise a combination of such memory types. In one embodiment, the bus 724 may comprise a Peripheral Component Interconnect Express (PCIe) bus. In some embodiments, the bus 724 may comprise multiple busses instead of a single bus.

Mass memory 730 illustrates another example of computer storage media for the storage of information such as computer-readable instructions, data structures, program modules, or other data. Mass memory 730 stores a basic input/output system ("BIOS") 740 for controlling the low-level operation of the device 700. The mass memory also stores an operating system 741 for controlling the operation of the device 700

Applications 742 may include computer-executable instructions which, when executed by the device 700, perform any of the methods (or portions of the methods) described previously in the description of the preceding Figures. In some embodiments, the software or programs implementing the method embodiments can be read from a hard disk drive (not illustrated) and temporarily stored in RAM 732 by CPU 722. CPU 722 may then read the software or data from RAM 732, process them, and store them in RAM 732 again.

The device 700 may optionally communicate with a base station (not shown) or directly with another computing device. The one or more network interfaces 750 are sometimes referred to as a transceiver, transceiving device, or network interface card (NIC).

The audio interface 752 produces and receives audio signals such as the sound of a human voice. For example, the audio interface 752 may be coupled to a speaker and microphone (not shown) to enable telecommunication with others or generate an audio acknowledgment for some action. Display 754 may be a liquid crystal display (LCD), gas plasma, light-emitting diode (LED), or any other type of display used with a computing device. Display 754 may also include a touch-sensitive screen arranged to receive input from an object such as a stylus or a digit from a human hand.

Keypad 756 may comprise any input device arranged to receive input from a user. Illuminator 758 may provide a status indication or provide light.

The device 700 also comprises an input/output interface 760 for communicating with external devices, using communication technologies, such as USB, infrared, Bluetooth™, or the like. The haptic interface 762 provides tactile feedback to a user of the client device.

The GPS receiver 764 can determine the physical coordinates of the device 700 on the surface of the Earth, which typically outputs a location as latitude and longitude values. GPS receiver 764 can also employ other geo-positioning mechanisms, including, but not limited to, triangulation, assisted GPS (AGPS), E-OTD, CI, SAI, ETA, BSS, or the like, to further determine the physical location of the device 700 on the surface of the Earth. In one embodiment, however, the device 700 may communicate through other components, provide other information that may be employed to determine the physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, the reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order. For example, two blocks shown in succession can, in fact, be executed substantially concurrently, or the blocks can sometimes be executed in the reverse order, depending upon the functionality/acts involved.

For the purposes of this disclosure, a non-transitory computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, cloud storage, magnetic cassettes, magnetic tape, magnetic disk storage, or other magnetic storage devices, or any other physical or material medium which can be used to tangibly store the desired information or data or instructions and which can be accessed by a computer or processor.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

We claim:

1. A method comprising:
reading, by a processing device, a configuration document associated with a first model;
incrementing, by the processing device, an internal write version of the configuration document;
storing, by the processing device, the internal write version in the configuration document;
generating, by the processing device, documents belonging to a second model such that respective document identifiers of the documents include a next external version in a first field and the incremented internal write version in a second field, the first field and second field comprising distinct sections of the document identifiers that maintain version coherence for model-specific embeddings during model transitions; and
uploading, by the processing device, the documents to a serving system, causing the serving system to atomically replace the first model with the second model, the atomic replacement ensuring that inferences access embeddings belonging to a single model version.

2. The method of claim 1, further comprising:
updating the configuration document such that an internal read version of the configuration document stores the incremented internal write version and an external version of the configuration document stores a next value.

3. The method of claim 2, further comprising:
reading the configuration document to obtain the internal read version; and
filtering accesses to the documents during an inference by the serving system such that only documents storing the read version are utilized.

4. The method of claim 1, wherein the documents of the second model include model-related data, the model-related data comprising updated embeddings and shared documents associated with the second model include model-agnostic data.

5. The method of claim 1, further comprising:
detecting and discarding obsolete documents by:
separating the documents into discrete sets so that a first subset documents are automatically overwritten in each model update and are not be explicitly discarded; and
detecting a second subset documents that have not been overwritten by comparing an associated internal read version to a current internal read version in the configuration document.

6. The method of claim 1, further comprising cycling the external version of the document identifiers through a range of numbers.

7. The method of claim 6, wherein the range of numbers comprises 0 and 1.

8. A non-transitory computer-readable storage medium for tangibly storing computer program instructions capable of being executed by a computer processor, the computer program instructions defining steps of:
reading a configuration document associated with a first model;
incrementing an internal write version of the configuration document;
storing the internal write version in the configuration document;
generating documents belonging to a second model such that respective document identifiers of the documents include a next external version a first field and the incremented internal write version in a second field, the first field and second field comprising distinct sections of the document identifiers that maintain version coherence for model-specific embeddings during model transitions; and
uploading the documents to a serving system, causing the serving system to atomically replace the first model with the second model, the atomic replacement ensuring that inferences access embeddings belonging to a single model version.

9. The non-transitory computer-readable storage medium of claim 8, the steps further comprising:
updating the configuration document such that an internal read version of the configuration document stores the incremented internal write version and an external version of the configuration document stores a next value.

10. The non-transitory computer-readable storage medium of claim 8, wherein the documents of the second model include model-related data, the model-related data comprising updated embeddings and shared documents associated with the second model include model-agnostic data.

11. The non-transitory computer-readable storage medium of claim 10, the steps further comprising:
   reading the configuration document to obtain the internal read version; and
   filtering accesses to the documents during an inference by the serving system such that only documents storing the read version are utilized.

12. The non-transitory computer-readable storage medium of claim 8, the steps further comprising:
   detecting and discarding obsolete documents by:
      separating the documents into discrete sets so that a first subset documents are automatically overwritten in each model update and are not be explicitly discarded; and
      detecting a second subset documents that have not been overwritten by comparing an associated internal read version to a current internal read version in the configuration document.

13. The non-transitory computer-readable storage medium of claim 8, the steps further comprising cycling the external version of the document identifiers through a range of numbers.

14. The non-transitory computer-readable storage medium of claim 13, wherein the range of numbers comprises 0 and 1.

15. A device comprising:
   a processor configured to:
      read a configuration document associated with a first model;
      increment an internal write version of the configuration document;
      store the internal write version in the configuration document;
      generate documents belonging to a second model such that respective document identifiers of the documents include a next external version a first field and the incremented internal write version in a second field, the first field and second field comprising distinct sections of the document identifiers that maintain version coherence for model-specific embeddings during model transitions; and
      upload the documents to a serving system, causing the serving system to atomically replace the first model with the second model, the atomic replacement ensuring that inferences access embeddings belonging to a single model version.

16. The device of claim 15, the processor further configured to:
   update the configuration document such that an internal read version of the configuration document stores the incremented internal write version and an external version of the configuration document stores a next value.

17. The device of claim 15, wherein the documents of the second model include model-related data, the model-related data comprising updated embeddings and shared documents associated with the second model include model-agnostic data.

18. The device of claim 17, the processor further configured to:
   read the configuration document to obtain the internal read version; and
   filter accesses to the documents during an inference by the serving system such that only documents storing the read version are utilized.

19. The device of claim 15, the processor further configured to:
   detect and discard obsolete documents by:
      separating the documents into discrete sets so that a first subset documents are automatically overwritten in each model update and are not be explicitly discarded; and
      detecting a second subset documents that have not been overwritten by comparing an associated internal read version to a current internal read version in the configuration document.

20. The device of claim 15, the processor further configured to cycle the external version of the document identifiers through a range of numbers.

* * * * *